United States Patent
Falkenberg et al.

(10) Patent No.: US 9,810,202 B2
(45) Date of Patent: Nov. 7, 2017

(54) ARRANGEMENT AND METHOD TO ROTATE THE HUB OF A WIND TURBINE

(71) Applicants: Peter Loevenskjold Falkenberg, Herning (DK); Karl Aage Maj, Hammel (DK); Jacob Blach Nielsen, Engesvang (DK); Henning Poulsen, Skjern (DK); Brian Rasmussen, Give (DK); Henrik Stiesdal, Odense C (DK)

(72) Inventors: Peter Loevenskjold Falkenberg, Herning (DK); Karl Aage Maj, Hammel (DK); Jacob Blach Nielsen, Engesvang (DK); Henning Poulsen, Skjern (DK); Brian Rasmussen, Give (DK); Henrik Stiesdal, Odense C (DK)

(73) Assignee: SIEMENS AKTIENGESELLSCHAFT, München (DE)

(*) Notice: Subject to any disclaimer, the term of this patent is extended or adjusted under 35 U.S.C. 154(b) by 830 days.

(21) Appl. No.: 13/855,839

(22) Filed: Apr. 3, 2013

(65) Prior Publication Data

US 2013/0272876 A1    Oct. 17, 2013

(30) Foreign Application Priority Data

Apr. 11, 2012  (EP) ..................... 12163736

(51) Int. Cl.
*F03D 1/00*   (2006.01)
*F03D 1/06*   (2006.01)
(Continued)

(52) U.S. Cl.
CPC ............ *F03D 11/00* (2013.01); *F03D 1/0658* (2013.01); *F03D 80/00* (2016.05);
(Continued)

(58) Field of Classification Search
CPC .......... F03D 1/00; F03D 1/0658; F03D 13/35; F05B 2230/608; F05B 2260/96; Y02E 10/721; Y02E 10/726; Y02P 70/523
(Continued)

(56) References Cited

U.S. PATENT DOCUMENTS 4,954,057 A * 9/1990 Caillat ................. F01C 1/0215
                                                    384/114
7,165,941 B2   1/2007 Wobben
(Continued)

FOREIGN PATENT DOCUMENTS

| CN | 1688808 A | 10/2005 |
|---|---|---|
| CN | 1777750 A | 5/2006 |
| DE | 102009011603 A1 | 9/2010 |

OTHER PUBLICATIONS

"A Problem With Wnd Power,", by Eric Rosenbloom, Sep. 5, 2006, pp. 1-8. Listed on the National Wind Watch website on the Internet at www.wind-watch.org.*

*Primary Examiner* — Mark Laurenzi
*Assistant Examiner* — Paul Thiede (57) ABSTRACT

An arrangement and a method of rotating a hub of a wind turbine are provided. A wind turbine includes a hub mounted to a nacelle, whereby the hub is rotatable around an axis of rotation in respect to the nacelle. A rotor blade is arranged at the hub that leads to a torque around the axis of rotation of the hub. A counter weight is attached to the hub, whereby the counter weight has a mass that leads to a counter-torque around the axis of rotation. The counter-torque interacts with the torque during the installation of a second rotor blade to the hub. The counter weight is mounted to the hub by a mechanical arrangement that is rotatable in respect to the hub around the axis of rotation of the hub. The mechanical (Continued)

arrangement and the counter weight are rotatable in respect to the hub into a certain predetermined position.

8 Claims, 11 Drawing Sheets

(51) Int. Cl.
*F03D 11/00* (2006.01)
*F03D 80/00* (2016.01)
(52) U.S. Cl.
CPC ....... *F05B 2230/608* (2013.01); *Y02E 10/721* (2013.01); *Y02E 10/726* (2013.01); *Y02P 70/523* (2015.11)
(58) Field of Classification Search
USPC .......... 416/19, 139, 144, 145, 210 A, 244 R, 416/500; 415/119
See application file for complete search history.

(56) References Cited

U.S. PATENT DOCUMENTS

| | | | |
|---|---|---|---|
| 7,353,603 B2 | 4/2008 | Wobben | |
| 2006/0147308 A1 | 7/2006 | Wobben | |
| 2014/0301845 A1* | 10/2014 | Kempkey | F03D 1/02 416/139 |
| 2015/0275853 A1* | 10/2015 | Canedo Pardo | F03D 1/001 29/889 |
| 2015/0275854 A1* | 10/2015 | Canedo Pardo | F03D 1/001 29/889 |
| 2016/0090962 A1* | 3/2016 | Gil Moll | F03D 1/0658 416/144 |

* cited by examiner

ARRANGEMENT AND METHOD TO ROTATE THE HUB OF A WIND TURBINE

CROSS REFERENCE TO RELATED APPLICATIONS

This application claims priority of European Patent Application No. 12163736.7 EP filed Apr. 11, 2013. All of the applications are incorporated by reference herein in their entirety.

FIELD OF INVENTION

An arrangement and a method to rotate the hub of a wind turbine are provided.

BACKGROUND OF INVENTION

A wind turbine transfers the energy of the wind into electrical energy. The wind turbine comprises a nacelle that is connected to a tower and a rotor that is connected to the nacelle. The rotor comprises a hub that is rotatable mounted to the nacelle and at least one rotor blade that is mounted to the hub.

The wind interacts with the rotor blade of the wind turbine in a way that the rotor rotates. The rotation of the rotor is transferred to an electrical generator.

When the wind turbine is erected, the tower is set up and the nacelle is mounted onto the tower. The hub is mounted to the nacelle and the at least one rotor blade is mounted to the hub.

The at least one rotor blade is hoisted up by a crane and connected to the hub. The hub has to be in a predetermined angular rotational position around its axis of rotation to establish the connection between the hub and the rotor blade.

This position corresponds to the direction of the blade during the fastening of the connection. The position can be a horizontal or a vertical arrangement of the hub and the rotor blade for example.

The hub has to be rotated to establish the connection between the hub and a first rotor blade. In the case of more then one rotor blade that has to be mounted, the position of the hub has to be changed between the mounting of one rotor blade and the next. The hub has to be rotated from the first into a second position to establish the connection between the hub and the second of the two rotor blades.

US 2006/0147308 A1 describes a method of mounting rotor blades to a rotor hub which is connected to a pod of a wind turbine power installation. The rotor hub is rotated into a predetermined first position. A rotor blade is fitted. The rotor hub is rotated by means of the rotor blade into a predetermined second position. A second rotor blade is mounted. The rotation of the rotor hub is effected in the direction of the effect of gravitational force of the first rotor blade which is already mounted.

This shows the disadvantage that the gravitational force of a first rotor blade will support the rotation into a second position only for a part of the rotation. In a certain second part of the rotation the rotation needs to be performed against the gravitational forces of the first rotor blade. Thus the described method is not reliable enough to perform the rotation of the hub during the installation of the rotor blades.

It is known to rotate the rotor of the wind turbine during the installation of the rotor blades by means of drives.

The installation of the first rotor blade results in an uneven distribution of the weight at the rotor. After the installation of the first rotor blade the rotor needs to the rotated into a second position for the installation of the next rotor blade. This leads to a changing and partially strong load during the rotation. The drive used to rotate the rotor has to be strong enough to overcome the changing and high load. Thus the drive has to be quite large to be able to rotate the rotor.

This leads to the disadvantage that a quite large drive needs to be installed at the wind turbine to rotate the rotor. In addition, the coupling of the drive and the rotor needs to be strong enough to transfer the loads.

U.S. Pat. No. 7,165,941 B2 describes a process for mounting rotor blades to a rotor hub of a wind power installation in situ. The process includes mounting a weight to at least one flange of the rotor hub. A rotor blade is mounted to at least one of the flanges, the hub is rotated into a predetermined position and the weight is exchanged for a rotor blade.

Thus high torque in the mechanical train of the wind power installation in the operation of mounting the rotor blades is avoided.

This shows the disadvantage that the weight is fixed at the position of the blade and needs to be detached when the blade is mounted.

SUMMARY OF INVENTION

It is an object to provide an improved method and apparatus to rotate the hub of a wind turbine during the installation of the rotor blades.

The object is achieved by the features of the independent claims. Preferred embodiments are described in the dependent claims.

A wind turbine comprises a hub mounted to a nacelle whereby the hub is rotatable around an axis of rotation in respect to the nacelle. At least one rotor blade is arranged at the hub that leads to a torque around the axis of rotation of the hub. A counter weight is attached to the hub, whereby the counter weight comprises a mass that leads to a counter-torque around the axis of rotation of the hub. The counter-torque interacts with the torque during the installation of at least a second rotor blade to the hub. The counter weight is mounted to the hub by a mechanical arrangement that is rotatable in respect to the hub around the axis of rotation of the hub. The mechanical arrangement and the counter weight is rotatable in respect to the hub into a certain predetermined position.

A hub is mounted rotatable to a nacelle. One or more rotor blades are mounted to the hub. When the wind turbine is in operation, the wind interacts with the rotor blades to rotate the hub with the rotor blades around an axis of rotation.

During the installation of the wind turbine, a nacelle is mounted on top of a tower. A hub is mounted to the nacelle; this can be done before or after the nacelle is mounted to the tower.

Rotor blades are mounted to the hub. Often the rotor blades are mounted to the hub after the hub and the nacelle are mounted on top of the tower. For this the rotor blades are hoisted up to the hub. This can be done by a crane for example. After the first rotor blade was mounted to the hub, a second rotor blade is hoisted up to the hub and is mounted to the hub. The installation of the rotor blades is continued until all rotor blades are installed.

For the installation of the rotor blades, the hub needs to be turned. For the installation of the first rotor blade the hub is rotated into a first position. After the installation of the first rotor blade the hub is rotated into a second position that is suitable for the installation of the second rotor blade. Also for the installation of the following rotor blades the hub and the rotor blades attached to the hub need to be rotated into a position suitable for the installation of the next rotor blade.

A rotor blade mounted to the hub leads to an imbalanced load distribution at the hub seen in respect to the axis of rotation of the hub. This is the case until all rotor blades are installed at the hub.

After the installation of the first rotor blade for example, the first rotor blade leads to a certain torque around the axis of rotation of the hub. Thus the drive installed to rotate the hub for the installation of the next rotor blade needs to overcome the torque of the first rotor blade.

The torque of a rotor blade installed at the hub depends on the weight of the rotor blade and the horizontal distance between the center of mass of the rotor blade and the axis of rotation of the hub.

The drive used needs to be big enough to rotate the hub and the rotor blades already attached to the hub.

A counter weight is installed at the hub. The counter weight is installed in a way that the torque of the counter weight acts in the opposite direction to the torque of the rotor blade seen in respect to the axis of rotation of the hub. The torque of the counter weight depends on the mass of the counter weight and the horizontal distance between the axis of rotation of the hub and the center of mass of the counter weight.

Thus the torque of the counter weight acts as a counter torque in respect to the torque of the rotor blade.

This can be done, when the counter weight is mounted to the hub mainly at the opposite side of the hub seen from the rotor blade that is creating the torque. This also means mainly the side at the hub opposing the rotor blade in respect to the axis of rotation of the hub.

So the counter torque reduces or minimizes the torque of the rotor blade. Thus the force needed to rotate the hub is reduced or minimized. Thus the size of the drive needed to rotate the hub can be reduced. Thus energy is saved.

An overall torque is the sum of the torque and the counter torque acting on the hub.

Big drives are expensive and heavy. Thus, when the drive is minimized, a less expensive and less heavy drive can be used. Thus the installation of the drive is easier. Thus the installation time is reduced. In addition the costs of the drive can be significantly reduced.

The mechanical arrangement is mounted to the hub in a way that it can be rotated around the axis of rotation of the hub in respect to the hub. The counter weight is mounted to the mechanical arrangement and can be rotated around the axis of rotation of the hub together with the counter weight.

Thus the mechanical arrangement can be rotated into a certain predetermined position in respect to the hub. Thus the counter weight mounted to the mechanical arrangement can be rotated into a certain predetermined position in respect to the hub.

When the counter weight is brought into a certain predetermined position in respect to the hub, a predetermined torque is created. Thus the torque resulting form the counter weight can be changed and adjusted.

The position of the counter weights can be adjusted in a way that the hub can be rotated from a first position into a second position only by the use of the counter weight. Thus no drive is needed for the rotation of the hub.

After the installation of a first rotor blade the position of the counter weight can be changed in respect to the hub, to assist in turning the hub into a second position. After the installation of a second rotor blade, the counter weight can be rotated into a third position to rotate the hub into a new position for the installation of a third rotor blade. To achieve this, the counter weight needs to be rotated around the axis of rotation into a different angular position in respect to the first or the second rotor blade. Thus the torque of the first and/or the second rotor blade can be minimized by the counter torque of the counter weight.

The mechanical arrangement can be mounted to the front of the hub for example. Thus it does not interfere with the rotor blade during the installation of the rotor blade. Thus the counter weight does not need to be detached for the installation of a rotor blade. Thus installation time is saved.

In a preferred embodiment the counter weight is arranged in a way that the counter-torque facilitates the rotation of the hub into a predefined position, which is used for the attachment of the second blade to the hub.

The counter torque of the counter weight helps to reduce the torque of the rotor blade or the rotor blades already installed at the hub. The hub has to be rotated into a certain position suitable for the installation of the next rotor blade. The torque at the axis of rotation of the hub is reduced. Thus the force needed to rotate the hub is reduced. Thus the counter weight helps to rotate the hub into a certain predetermined position. Thus the drive needed of the rotation can be minimized. Thus the energy needed for the rotation is reduced.

In a preferred embodiment the torque of the counter weight at least partially compensates the torque of at least one rotor blade attached to the hub.

The counter torque of the counter weight can be in absolute figures smaller then or equal to the torque of the one or more rotor blades installed to the hub. Thus the overall torque is reduced or compensated.

In a preferred embodiment a drive is used to rotate the hub, whereby the counter-torque facilitates the rotation of the hub by reducing the load at the drive.

To rotate the hub a drive can be used. As the torque of the rotor blade installed is reduced by the counter torque of the counter weight, the force needed to rotate the rotor can be reduced. With a reduced force to rotate the rotor, the force of the drive needed to rotate the hub can be reduced. Thus the drive needed to rotate the hub can be reduced or minimized.

In a preferred embodiment the counter torque assists the rotation of the hub around its axis of rotation by the help of gravity.

The counter torque of the counter weight can be bigger then the torque of the rotor blade of rotor blades installed at the hub. Thus the torque is overcompensated. Thus the rotation of the hub is enforced by the resulting counter torque. Thus the rotation of the hub is enforced by the gravity acting on the counter weight. Thus no drive is needed to rotate the hub.

In a preferred embodiment the counter weight is mounted to the hub via a mechanical arrangement. It is mounted in a way that the counter weight can be moved along an axis towards and away from the axis of rotation of the hub.

Thus the distance between the center of mass of the counter weight and the axis of rotation of the hub can be varied. Thus the counter torque can be varied. Thus the force of the counter torque acting on the hub can be adjusted to a certain predetermined value.

The counter weight can be moved into a position, where the center of mass of the counter weight and the mechanical arrangement is on or close to the axis of rotation of the hub. Thus the value of the counter torque can be adjusted to be zero or close to zero.

Thus the value of the counter torque can be set to partially compensate, compensate or over compensate the value of the torque of the rotor blade.

Thus the overall torque acting on the hub can be set to a certain predetermined value. The overall torque can be used to assist the rotation of the hub. Thus the rotation of the hub can be driven by the overall torque acting on the hub. Thus no drive is needed to rotate the hub.

In a preferred embodiment the mechanical arrangement is a lever.

The mechanical arrangement can be a lever and the counter weight is attached to the lever. The lever is mounted to the hub. The lever is rotatable mounted to the hub, so that the lever with the counter weight can be rotated around the axis of rotation of the hub.

The lever can provide a certain distance between the center of mass of the counter weight and the axis of rotation. The lever is a structure strong enough to transfer the forces of the counter torque of the counter weight to the hub.

In a preferred embodiment the counter weight is movable along the lever.

The counter weight can be moved along the length of the lever. Thus the distance of the center of mass of the counter weight and the axis of rotation of the hub can be varied. Thus the resulting counter torque can be adjusted.

In a preferred embodiment the counter weight and the lever are movable in respect to the hub. The counter weight and the lever can be moved along an axis towards and away from the axis of rotation of the hub.

The counter weight is attached to the lever. The lever is movable attached to the hub. Thus the lever and the counter weight can be moved in a way to vary the distance between the center of mass of the counter weight and the axis of rotation of the hub. Thus the counter torque of the counter weight can be adjusted. The axis, along which the lever and the counter weight can be moved, can be the axis of the lever.

In a preferred embodiment the mechanical arrangement is a combination of a first cantilever, comprising a first end and a second end, and a second cantilever. The second cantilever comprises a first end and a second end. The first end of the first cantilever is attached to the hub. The second end of the first cantilever is attached to the first end of the second cantilever by a pivot joint. The counter weight is attached to the second end of the second cantilever.

The mechanical arrangement comprises a first cantilever and a second cantilever. The two cantilevers are connected together by a pivot joint. The mechanical arrangement is connected to the hub. A counter weight is mounted to the mechanical arrangement. The counter weight and the mechanical arrangement are arranged in a way that the distance between the center of mass of the counter weight and the axis of rotation of the hub can be changed. The distance can be changed by pivoting the cantilevers around the pivot joint in respect to each other.

The angle between the cantilevers can be changed by pivoting the cantilevers around the pivot joint. To increase the distance between the center of mass of the counter weight and the axis of rotation of the hub, the angle between the cantilevers is increased up to a maximum of 180°. To decrease the distance, the angel between the two cantilevers is reduced. The minimum angel between the two cantilevers can be 0° for example. Thus the distance between the center of mass of the counter weight and the axis of rotation of the hub can be changed. Thus the counter torque of the counter weight can be adjusted. Thus the counter torque interacts with the torque of a rotor blade installed at the hub and the resulting torque can be adjusted to a certain predetermined value.

In a preferred embodiment the hub is prepared to receive the mechanical arrangement and the counter weight before the hub is mounted to the nacelle.

Thus the hub is mounted to the nacelle with the mechanical arrangement and the counter weight attached to the hub. Thus the combination is mounted in one lifting operation of a crane. Thus no additional lifting action of the crane is necessary. Thus installation time and crane time is saved.

In a preferred embodiment the hub is prepared to receive the mechanical arrangement and the counter weight after the hub was mounted to the nacelle.

Thus the hub is mounted to the nacelle and thereafter the mechanical arrangement and the counter weight is mounted to the hub. The weight of the single parts, like the hub, the mechanical arrangement, and the counter weight are lifted separately by the crane. Thus the maximum weight of a lifting operation of the crane is limited. Thus a crane capable of lifting the limited weight can be used. Thus costs for the crane are saved.

In a preferred embodiment the counterweight and the mechanical arrangement are detachable from the hub after the installation of the rotor blades.

After the rotor blades are installed at the hub, the mechanical arrangement and the counter weight can be detached from the hub. The mechanical arrangement and the counter weight can be reused in the installation of another wind turbine.

The mechanical arrangement and the counter weight can again be attached to the hub, in the case that a rotor blade needs to be exchanged. An exchange of a rotor blade might be necessary after a certain time of operation of the wind turbine.

Thus the exchange of the rotor blade can be assisted by the counter weight and the mechanical arrangement.

A method is described to rotate a hub of a wind turbine. A hub of the wind turbine is capable of rotating around an axis of rotation in respect to a nacelle of the wind turbine.

At least one rotor blade, which is arranged at the hub, is leading to a torque around the axis of rotation. A mass of a counter weight, which is attached to the hub, is leading to a counter-torque around the axis of rotation. The counter-torque is interacting with the torque during the installation of at least a second rotor blade to the hub.

The counter weight and the mechanical arrangement are rotated around the axis of rotation of the hub in respect to the hub into a certain predetermined position.

The figures show a preferred configuration and do not limit the scope of the invention.

DETAILED DESCRIPTION OF INVENTION

Figure 1:
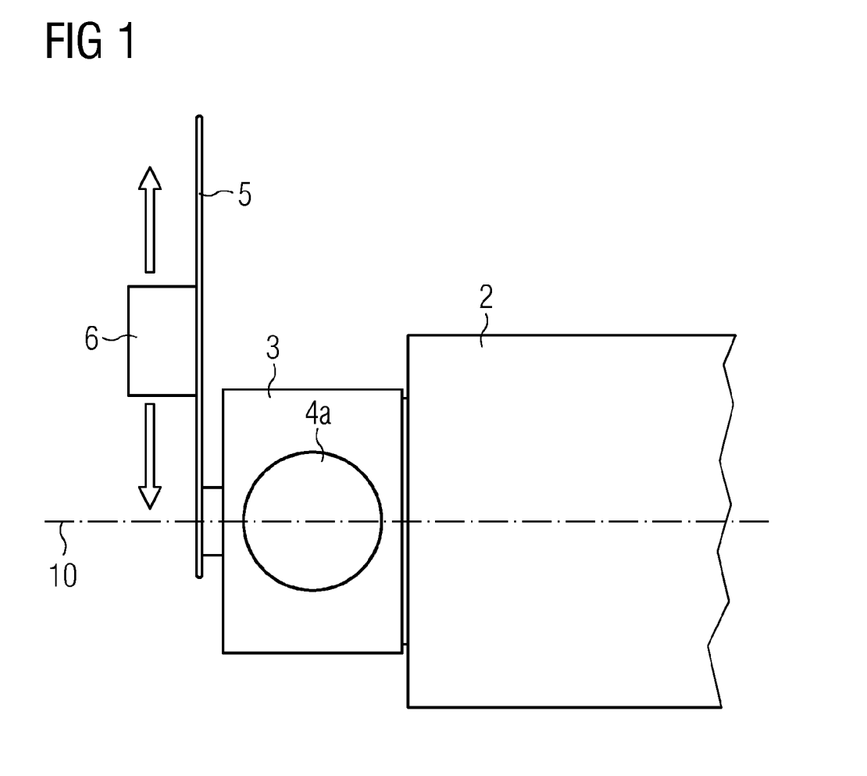
FIG. 1 shows a view of a hub and nacelle in accordance with an embodiment of the disclosure.

FIG. 1 shows a nacelle 2 of a wind turbine. Attached to the nacelle 2 is a hub 3 that is prepared to receive rotor blades mounted to the hub 3. A rotor blade may be mounted to a designated spot 4*a*, for example. Attached to the front of the hub 3 is a lever 5 which points outward in radial direction seen in respect to the axis of rotation 10 of the wind turbine hub 3.

The lever 5 may be rotated around the axis of rotation 10 of the hub 3 in respect to the hub 3. The lever 5 is detachably mounted to the hub 3 of the wind turbine. The lever 5 may be mounted to the hub 3 before the installation of the first rotor blade and may be detached from the hub 3 after the installation of the rotor blades.

Attached to the lever 5 is a counter weight 6. The counter weight 6 is movable along the lever 5. A distance between the center of mass of the counter weight 6 and the axis of rotation 10 of the hub 3 may be set to a certain predetermined distance. Thus the weight of the counter weight 6 will result in a certain predetermined torque at the hub 3. The torque depends on the position of the counter weight 6 along the lever 5, and the position of the lever 5 in respect to the hub 3.

Figure 2:
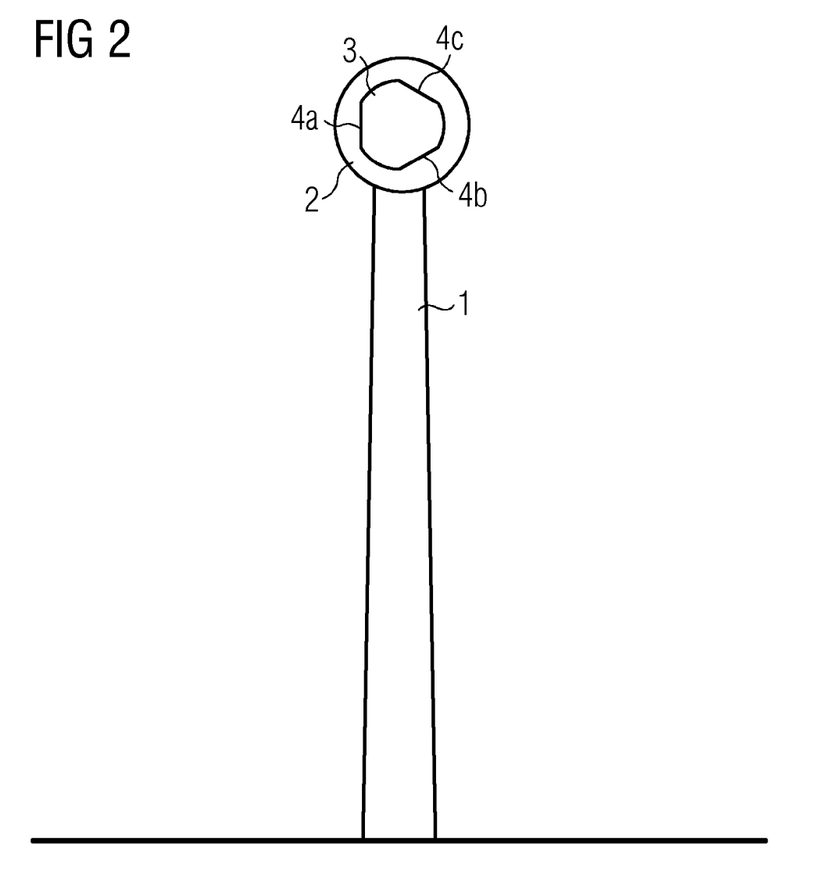
FIG. 2 shows a wind turbine during installation.

FIG. 2 shows a wind turbine during installation. A nacelle 2 is installed on a tower 1. Attached to the nacelle 2 is a hub 3. The hub 3 shows several spots 4*a*, 4*b*, 4*c* where rotor blades will be mounted. FIG. 2 shows three places 4*a*, 4*b*, 4*c* for rotor blades.

Figure 3:
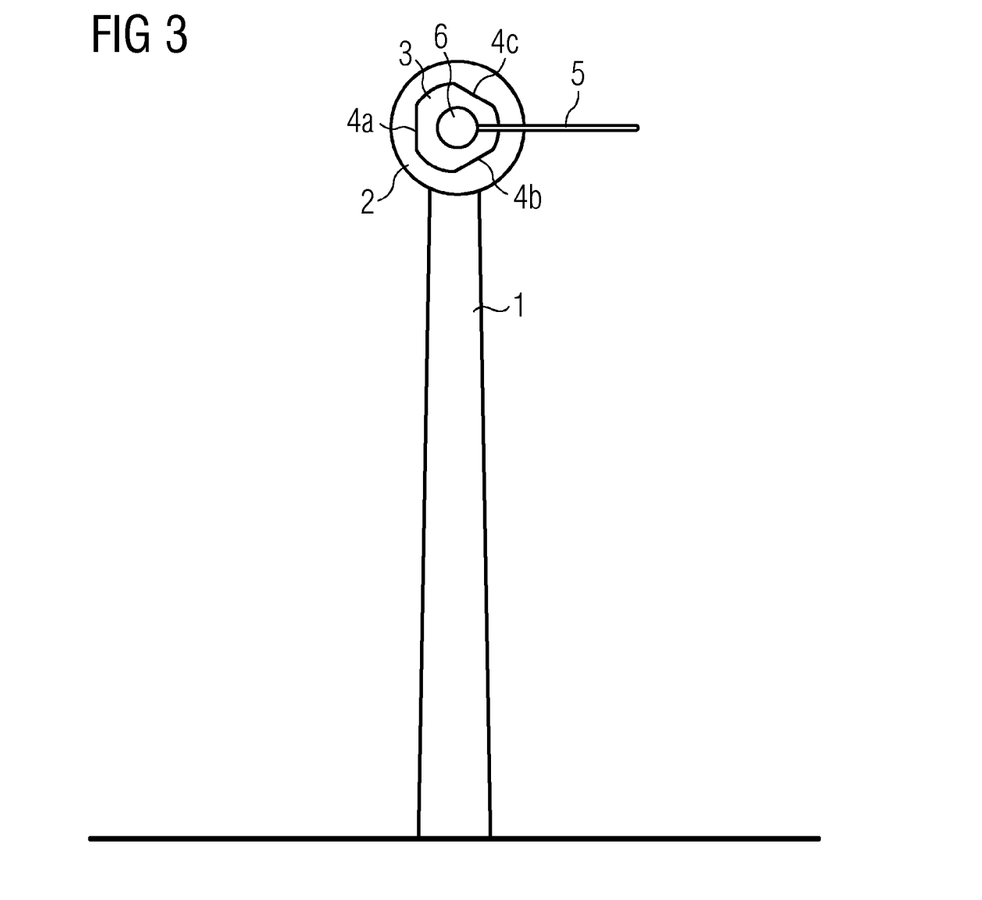
FIG. 3 shows a wind turbine with the lever and the counterweight.

FIG. 3 shows a wind turbine with the lever and the counterweight. FIG. 3 shows the wind turbine of FIG. 2. In addition, a lever 5 and a counter weight 6 are attached at the front of the hub 3. The front side of the hub 3 is the side which may be covered with the spinner nose later during the installation.

The hub 3 is rotated into a first position to allow the installation of a first rotor blade. In this case the spot to mount a first rotor blade 4*a* is arranged in a way that the rotor blade can be attached mainly horizontally.

The lever 5 is rotated in respect to the hub 3 in a way that is pointing away from the spot to attach a first rotor blade. In this case the lever 5 is pointing mainly horizontally away from the spot 4*a*. The counter weight 6 is arranged with its center of mass close to the axis of rotation of the hub 3. As there is no rotor blade attached to the hub 3 yet, no torque from the counter weight 6 is needed to compensate the torque of the rotor blade.

Figure 4:
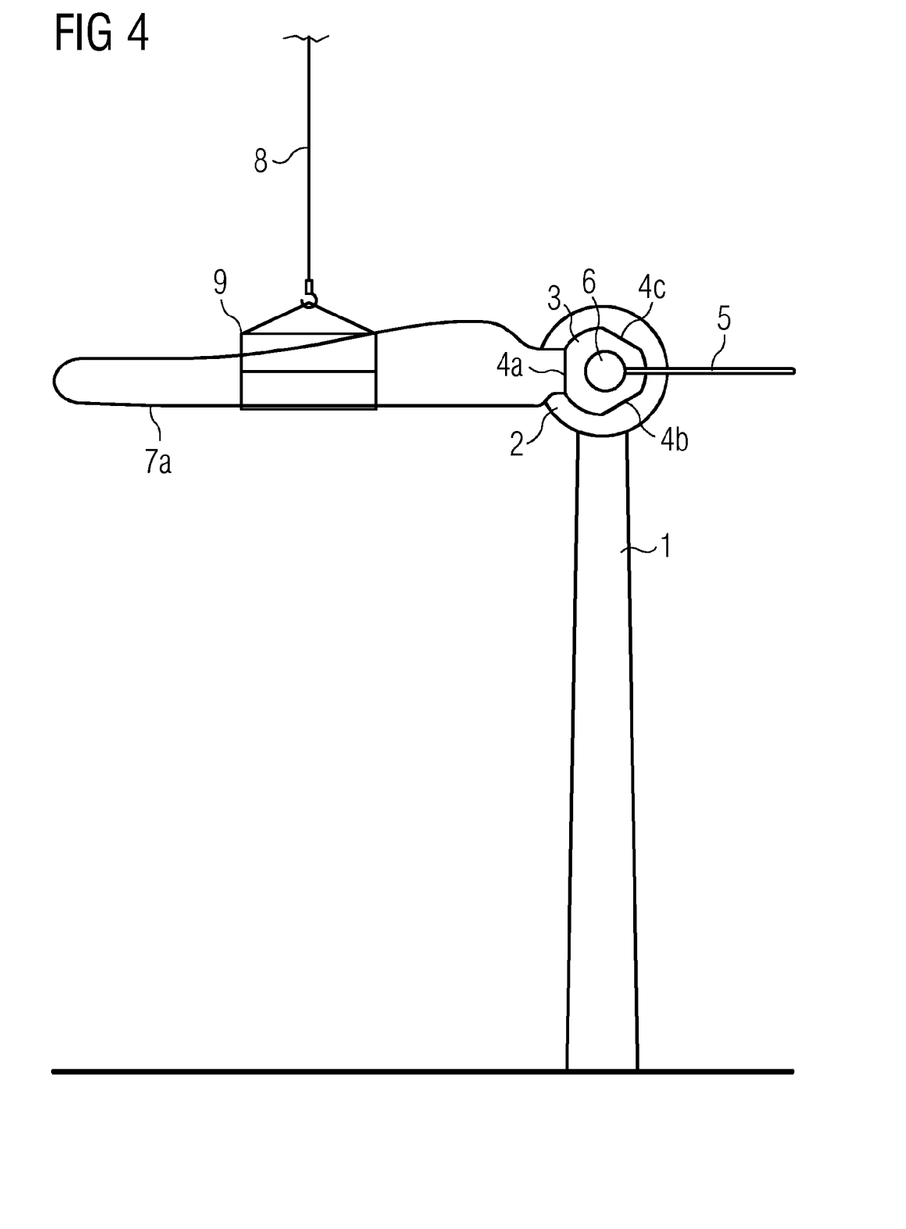
FIG. 4 shows a wind turbine during installation of a first rotor blade.

FIG. 4 shows a wind turbine during installation of a first rotor blade 7*a*. FIG. 4 shows the wind turbine of FIG. 3. In addition, a first rotor blade 7*a* is attached to the hub 3 at the spot 4*a*.

The rotor blade 7*a* is lifted by a crane 8 and a lifting device 9. The crane 8 adjusts the first rotor blade 7*a* in a way that the attachment points at the rotor blade 7*a* align with their counter parts at the hub 3. Then the first rotor blade 7*a* is attached to the hub 3.

The counter weight 6 stays close to the axis of rotation of the hub 3, as long as the weight of the first rotor blade 7*a* is still carried by the lifting device 9 and the crane 8.

Figure 5:
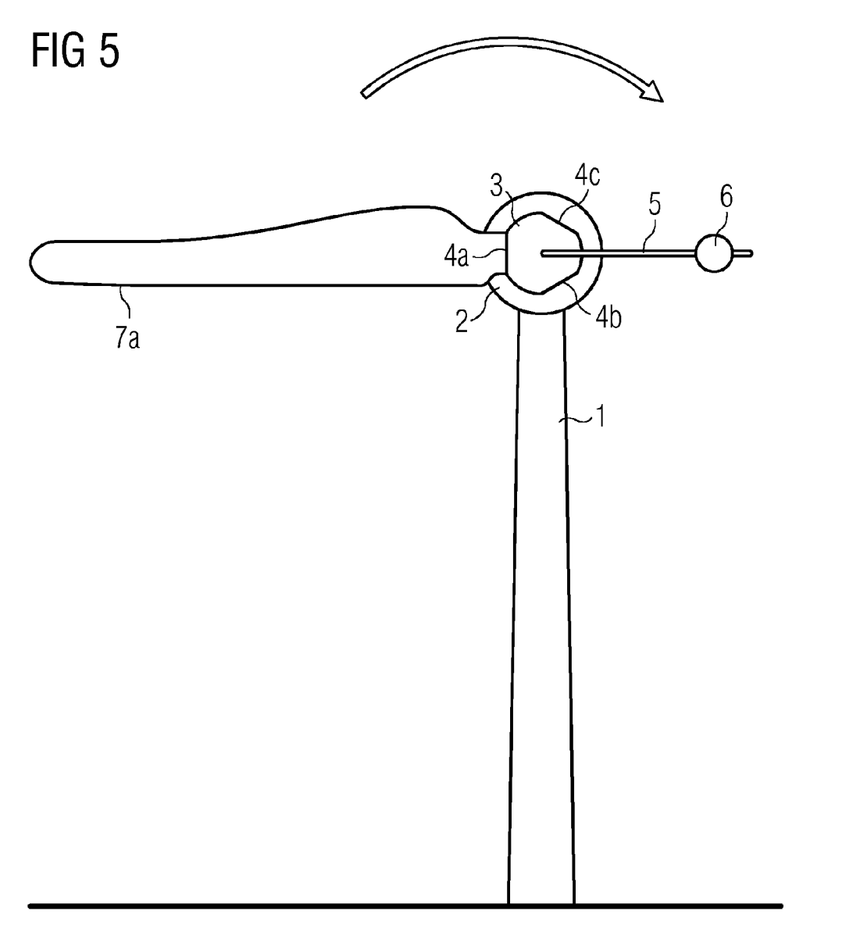
FIG. 5 shows a wind turbine during installation of the rotor blades.

FIG. 5 shows a wind turbine during installation of the rotor blades. FIG. 5 shows the wind turbine during the installation of the first rotor blade 7*a* as seen in FIG. 4. In FIG. 5, the crane 8 and the lifting device 9 (see FIG. 4) are detached from the first rotor blade 7*a*, so the weight of the first rotor blade 7*a* is now carried by the hub 3. The weight of the rotor blade 7*a* leads to a torque at the hub 3 of the wind turbine.

The counter weight 6 is now moved along the lever 5 outward, away from the axis of rotation of the hub 3, to increase the torque of the counter weight 6 at the hub 3. Thus the torque of the counter weight 6 compensates at least a part of the torque of the first rotor blade 7*a* acting on the hub 3.

To install a second rotor blade, the hub 3 needs to be rotated into a second position. The rotation of the hub 3 is shown by the arrow in the FIG. 5.

The torque of the first rotor blade 7*a* and the torque of the counter weight 6 at least partially compensate each other. Thus the load at the drive, turning the hub 3 around its axis of rotation, is smaller then without the counter weight 6.

The counter weight 6 may also be moved further out along the lever 5 so that the torque of the counter weight 6 is bigger than the torque of the first rotor blade 7*a*. Thus the torque of the first rotor blade 7*a* is over-compensated by the torque of the counter weight 6 and the hub 3 of the wind turbine may be rotated around its axis of rotation without the need of a drive. The hub 3 may be rotated by the help of gravity at the counter weight 6.

Figure 6:
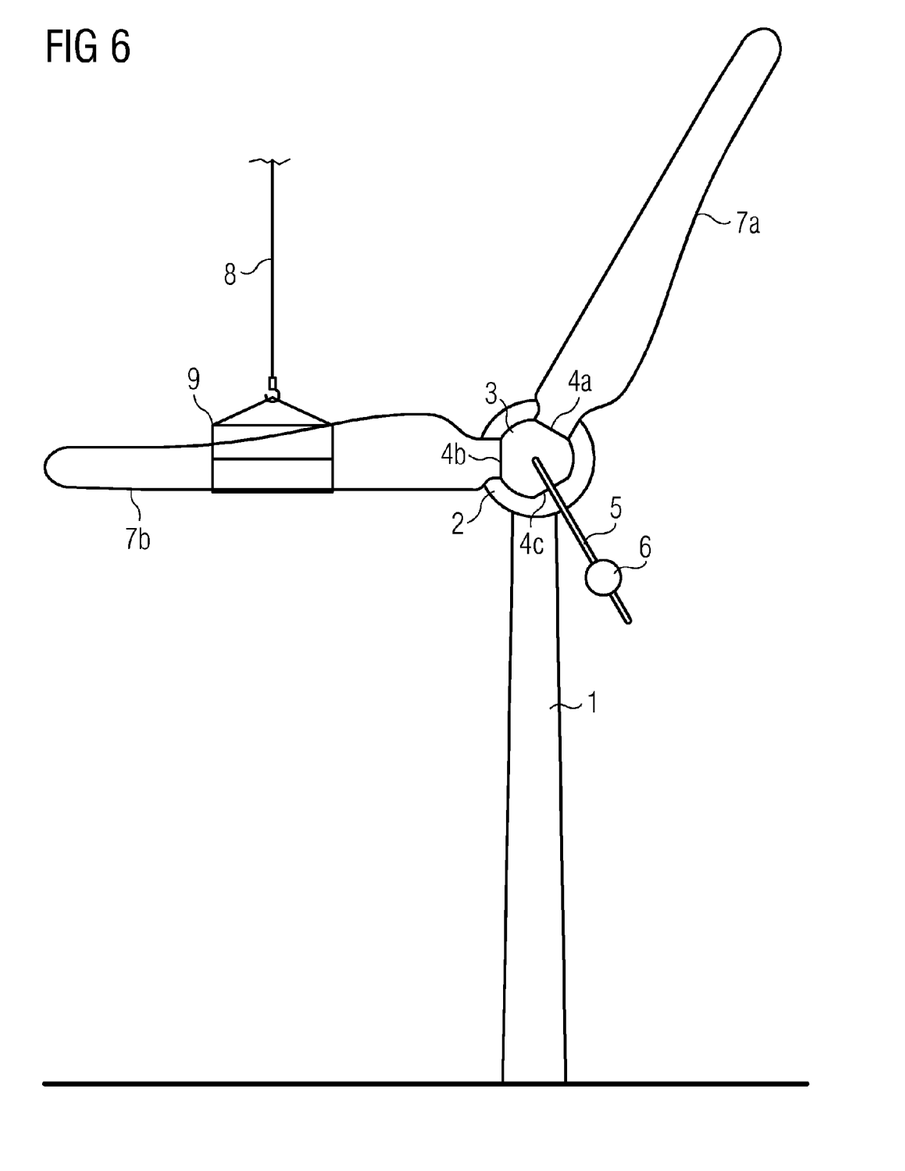
FIG. 6 shows a wind turbine during installation of a second rotor blade.

FIG. 6 shows a wind turbine during installation of a second rotor blade 7*b*.

FIG. 6 shows the wind turbine as shown in FIG. 5 during the installation of rotor blades. The hub 3 of the wind turbine is now turned into a second position, where a second rotor blade 7*b* is installed at a spot 4*b*.

The crane 8 and the lifting device 9 lift a second rotor blade 7*b* up to the hub 3. The rotor blade 7*b* is attached to the hub 3 at the spot 4*b*.

After the crane 8 and the lifting device 9 are removed from the second rotor blade 7*b* the lever 5 is arranged into a certain predetermined position in respect to the rotor blades 7*a* and 7*b*. The counter weight 6 is adjusted to a second distance from the hub 3 along the lever 5, so that the torque of the counter weight 6 can at least partially compensates the resulting torque of the first and the second rotor blade 7*a* and 7*b*.

Figure 7:
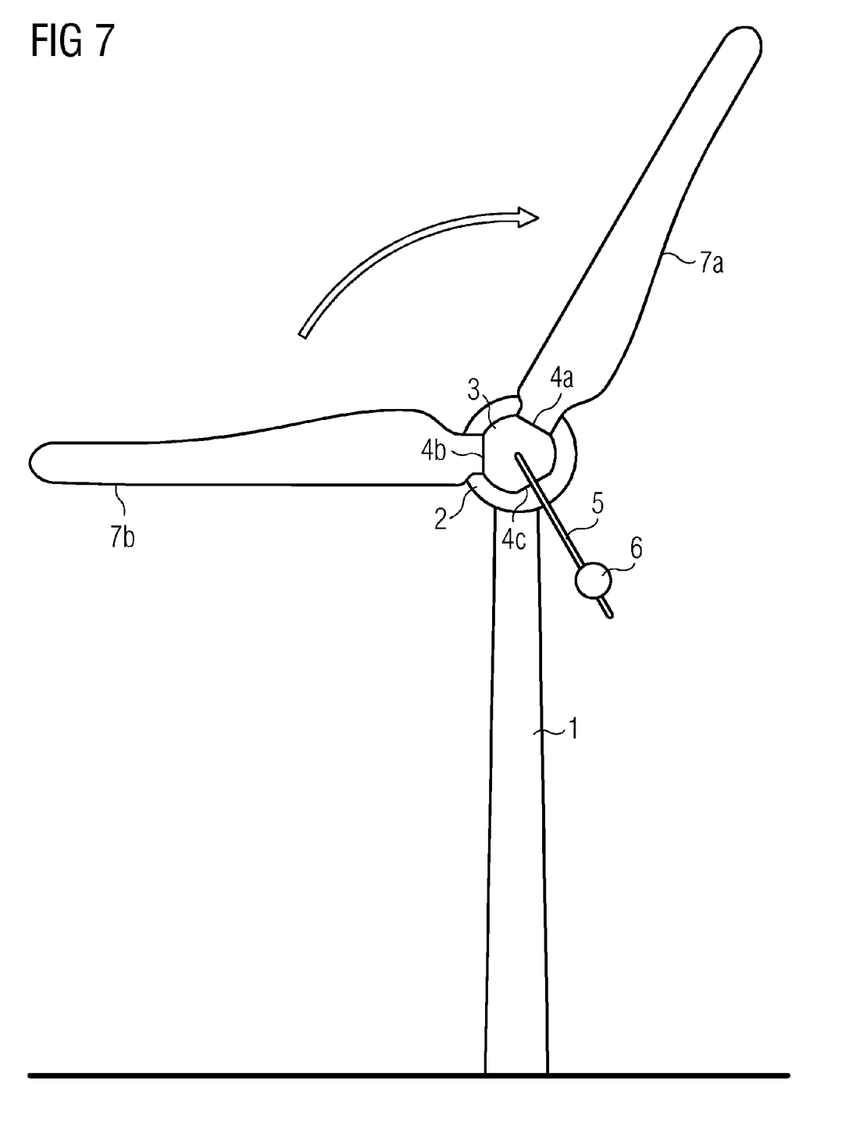
FIG. 7 shows a wind turbine during installation of the rotor blades.

FIG. 7 shows a wind turbine during installation of the rotor blades. The hub 3 of the wind turbine is, together with the first and the second rotor blades 7*a* and 7*b* and the counter weight 6 at the lever 5, rotated into a third position around the axis of rotation of the hub 3. The rotation is illustrated in FIG. 7 by the arrow.

After the hub 3 has been rotated into the third position, the third rotor blade is being installed to the hub 3 at the spot 4*c*.

The torque of the counter weight 6 at the lever 5 compensates at least a part of the resulting torque of the rotor blades 7*a* and 7*b*. Thus the load at the drive that is turning the hub 3 is minimized.

The torque of the rotor blades 7*a* and 7*b* may be over-compensated by the counter weight 6. The hub 3 can then be rotated by the help of gravity.

Figure 8:
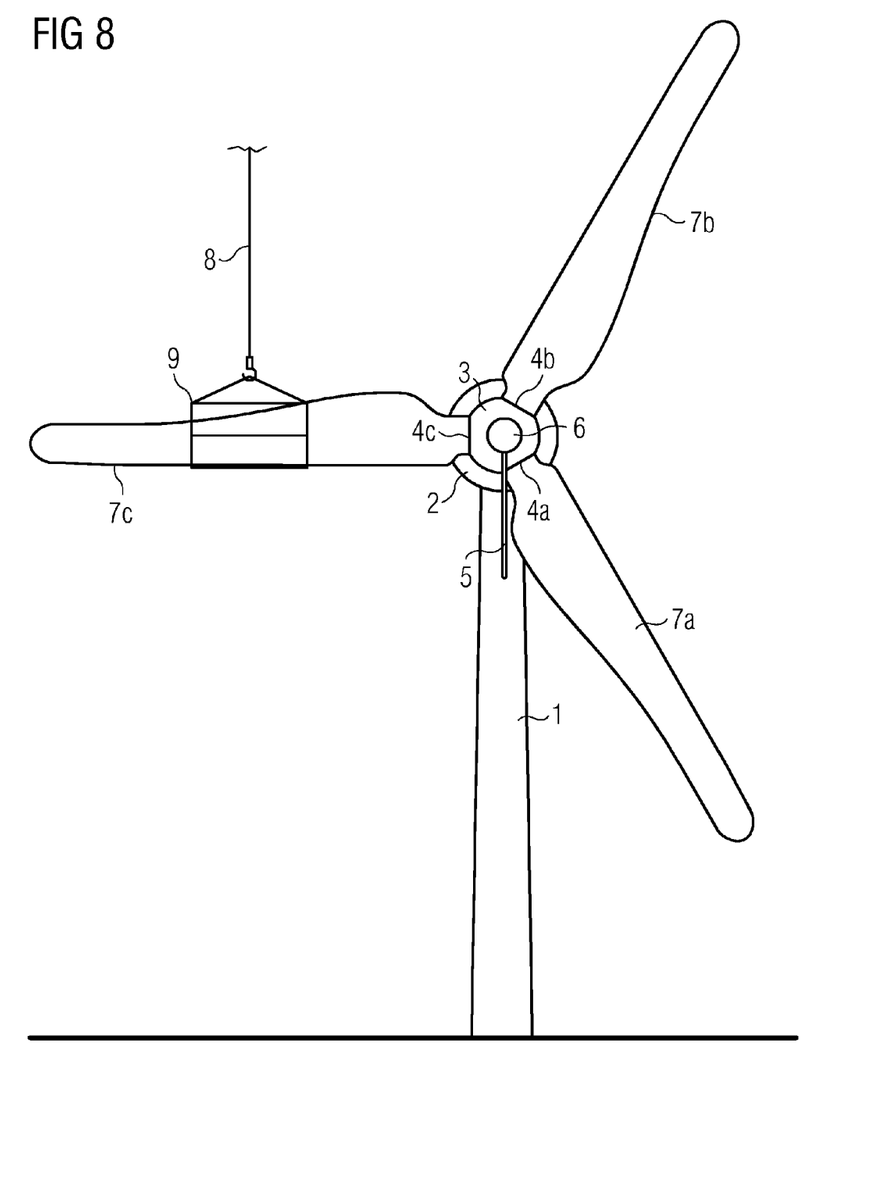
FIG. 8 shows a wind turbine during the installation of a third rotor blade.

FIG. 8 shows a wind turbine during the installation of a third rotor blade 7*c*. The hub 3 has been rotated into a third position suitable to install the third rotor blade 7*c*.

The third rotor blade 7*c* is lifted by help of the crane 8 and the lifting device 9 up to the spot 4*c*. The rotor blade 7*c* is attached to the hub 3 at the spot 4*c*.

When the lifting device 9 and the crane 8 are removed from the rotor blade 7c, the hub 3 carries the load of the rotor blade 7c. The torque of the rotor blade 7c compensates at least partially the torque of the two rotor blades 7a and 7b.

Thus, the counter weight 6 and the lever 5 are no longer needed. The counter weight 6 is moved along the lever 5 towards the axis of rotation of the hub 3. Thus the torque of the counter weight 6 is minimized.

After the installation of the rotor blades 7a, 7b and 7c is finished, the counter weight 6 and the lever 5 are detached from the hub 3 of the wind turbine. This may be done by the help of the crane 8.

Figure 9:
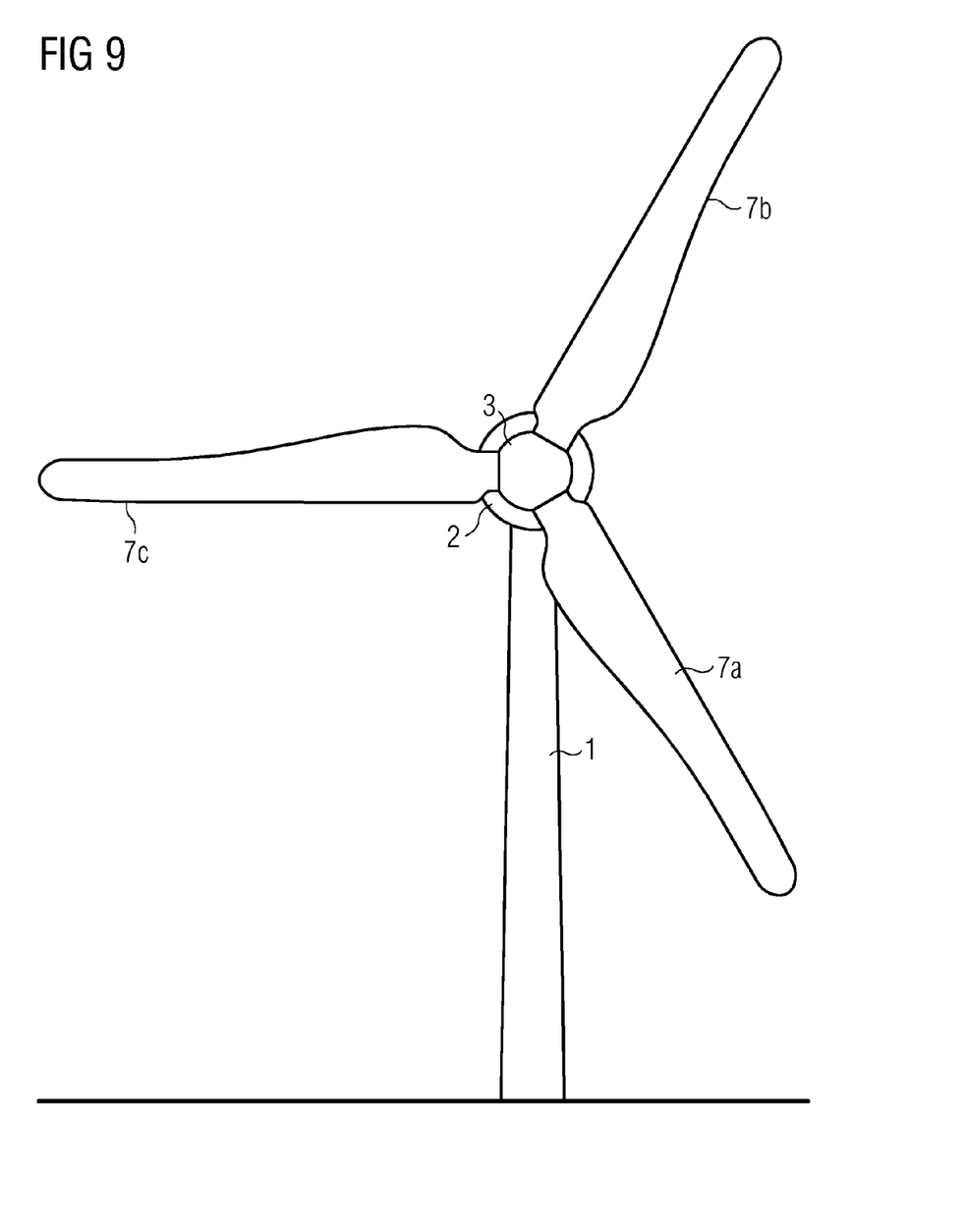
FIG. 9 shows a wind turbine after the installation of the rotor blades.

FIG. 9 shows a wind turbine after the installation of the rotor blades 7a, 7b and 7c. FIG. 9 shows the wind turbine after the installation of all three rotor blades 7a, 7b and 7c. The counter weight and the lever have been removed from the wind turbine.

Figure 10:
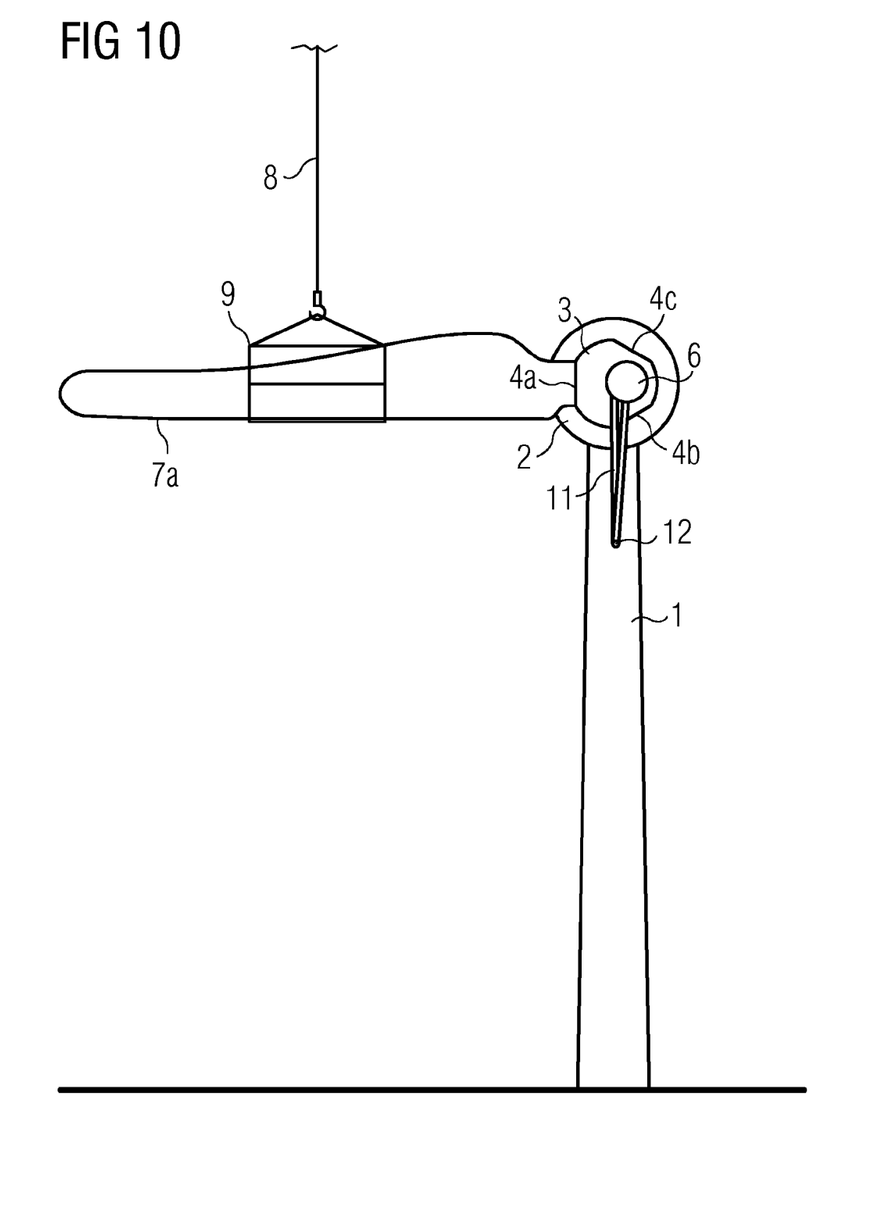
FIG. 10 shows a view of a hub and nacelle in accordance with another embodiment of the disclosure.

FIG. 10 shows a second embodiment. FIG. 10 shows a wind turbine with a nacelle 2 and a hub 3. The hub 3 is prepared to receive three rotor blades at the spots 4a, 4b and 4c.

A rotor blade 7a is lifted by a lifting device 9 and a crane 8. The rotor blade 7a is to be mounted to the spot 4a at the hub 3. At the hub 3, a first cantilever 11 is attached with its first end. The second end of the first cantilever 11 is attached to a first end of a second cantilever 11 by a pivot joint 12. A counter weight 6 is attached to the second end of the second cantilever 11.

The angle between the cantilevers 11 is mainly 0 degree at the pivot joint 12. Thus the center of the mass of the counter weight 6 is close to the axis of rotation of the hub.

The distance between the axis of rotation of the hub 3 and the center of the mass of the counter weight 6 may be increased by increasing the angle between the cantilevers 11.

Figure 11:
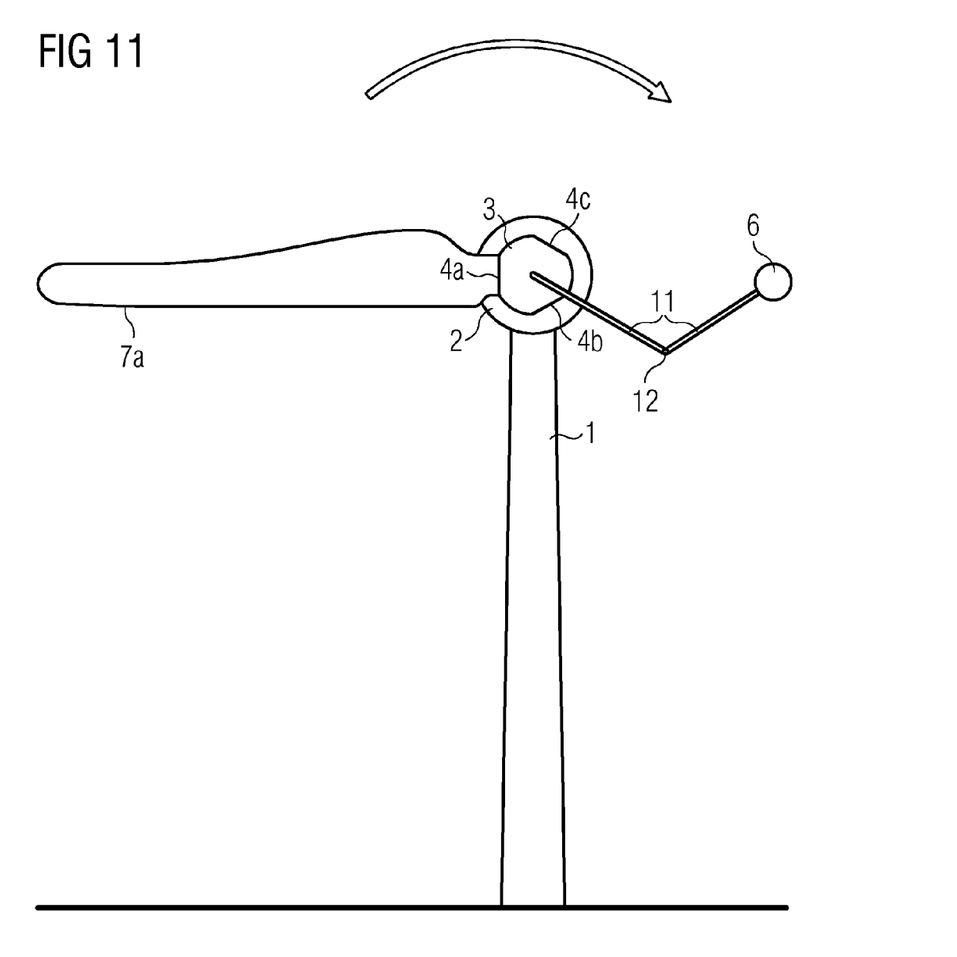
FIG. 11 shows the second embodiment in use.

FIG. 11 shows the second embodiment in use. FIG. 11 shows the wind turbine of FIG. 10 with the cantilevers 11 and the counterweight 6 attached to the hub 3.

The rotor blade 7a is attached to the hub 3 at the spot 4a. The lifting device 9 and the crane 8 are removed.

The weight of the rotor blade 7a leads to a torque at the hub 3. To compensate the torque of the rotor blade 7a the angle between the cantilevers 11 is increased at the pivot joint 12. Thus, the distance between the center of the mass of the counter weight 6 and the axis of rotation of the hub 3 increases. Thus the torque at the hub 3 caused by the counter weight 6 increases.

The cantilevers 11 are adjusted in a way that the counter weight 6 is now on the other side of the hub 3 then the rotor blade 7a. Thus the torque of the counter weight 6 at least partially compensates the torque of the rotor blade 7a. The hub 3 can now be rotated into a second position to install a second rotor blade. The rotation is illustrated by the arrow in FIG. 11.

The drive used for the rotation of the hub 3 needs less power, as the load at the hub due to the rotor blade 7a is compensated by the counter weight 6.

The torque of the rotor blade 7a may be over-compensated by the counter weight 6. Thus the rotation of the hub 3 is started without the help of a drive.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A wind turbine, comprising:
    a hub mounted to a nacelle, wherein the hub is rotatable with respect to the nacelle around an axis of rotation of the hub,
    a first rotor blade arranged at the hub, wherein the first rotor blade leads to a torque around the axis of rotation of the hub,
    a counter weight mounted to the hub by a lever that is rotatable with respect to the hub around the axis of rotation so that the lever and the counter weight are rotatable with respect to the hub into a predetermined position, wherein the lever is mounted at the axis of rotation of the hub; and
    whereby the counter weight is adapted to provide a counter-torque around the axis of rotation of the hub, wherein the counter-torque reduces the torque of the first rotor blade.

2. The wind turbine according to claim 1, wherein the counter weight is arranged such that the counter-torque facilitates a rotation of the hub into a predefined position which is used for arranging the second rotor blade to the hub.

3. The wind turbine according to claim 1, wherein the counter-torque of the counter weight at least partially compensates the torque of the first rotor blade attached to the hub.

4. The wind turbine according to claim 1, wherein the counter weight is mounted to the hub via the lever such that the counter weight is moveable along an axis towards and away from the axis of rotation of the hub.

5. The wind turbine according to claim 1, wherein the counter weight is movable along the lever.

6. The wind turbine according to claim 5, wherein the counter weight is movable with respect to the hub such that the counter weight is movable along an axis towards and away from the axis of rotation of the hub.

7. The wind turbine according to claim 1, wherein the counter weight and the lever are detachable from the hub after installation of the first rotor blade and the second rotor blade.

8. A method for use with a wind turbine, comprising:
    mounting a hub of the wind turbine to a nacelle, wherein the hub is rotatable with respect to the nacelle around an axis of rotation of the hub,
    arranging a first rotor blade at the hub, wherein the first rotor blade leads to a torque around the axis of rotation,
    arranging a counter weight to the hub via a lever, wherein a mass of the counter-weight leads to a counter-torque around the axis of rotation, wherein the counter-torque interacts with the torque during installation of a second rotor blade to the hub, wherein the lever is mounted at the axis of rotation the hub, and
    rotating the counter weight and the lever around the axis of rotation of the hub with respect to the hub into a predetermined position.

* * * * *